United States Patent [19]
Howard

[11] Patent Number: 5,927,103
[45] Date of Patent: Jul. 27, 1999

[54] CARBON DIOXIDE PRODUCTION SYSTEM WITH INTEGRAL VENT GAS CONDENSER

[75] Inventor: Henry Edward Howard, Grand Island, N.Y.

[73] Assignee: Praxair Technology, Inc., Danbury, Conn.

[21] Appl. No.: 09/098,431

[22] Filed: Jun. 17, 1998

[51] Int. Cl.[6] .................................................. F25J 3/00
[52] U.S. Cl. .................................. 62/620; 62/928; 62/930
[58] Field of Search .............................. 62/620, 631, 617, 62/928, 929, 930, 630

[56] References Cited

U.S. PATENT DOCUMENTS

| | | | |
|---|---|---|---|
| 2,632,316 | 11/1953 | Eastman | 62/175.5 |
| 3,614,872 | 10/1971 | Tassoney et al. | 62/928 X |
| 3,983,711 | 10/1976 | Solomon | 62/28 |
| 4,152,129 | 5/1979 | Trentham et al. | 62/18 |
| 4,441,900 | 4/1984 | Swallow | 62/29 |
| 4,514,203 | 4/1985 | Gazzi et al. | 62/17 |
| 4,595,404 | 6/1986 | Ozero et al. | 62/18 |
| 4,952,223 | 8/1990 | Kirshnamurthy et al. | 62/928 X |
| 4,990,168 | 2/1991 | Sauer et al. | 62/929 X |

*Primary Examiner*—William Doerrler
*Attorney, Agent, or Firm*—Stanley Ktorides

[57] ABSTRACT

A system for producing carbon dioxide, particularly from a feed which contains significant levels of light contaminants, wherein light overhead from a distillation column is partially condensed against heat exchange fluid containing both carbon dioxide and light contaminants and the resulting heat exchange fluid passed into the feed for the distillation column.

10 Claims, 1 Drawing Sheet

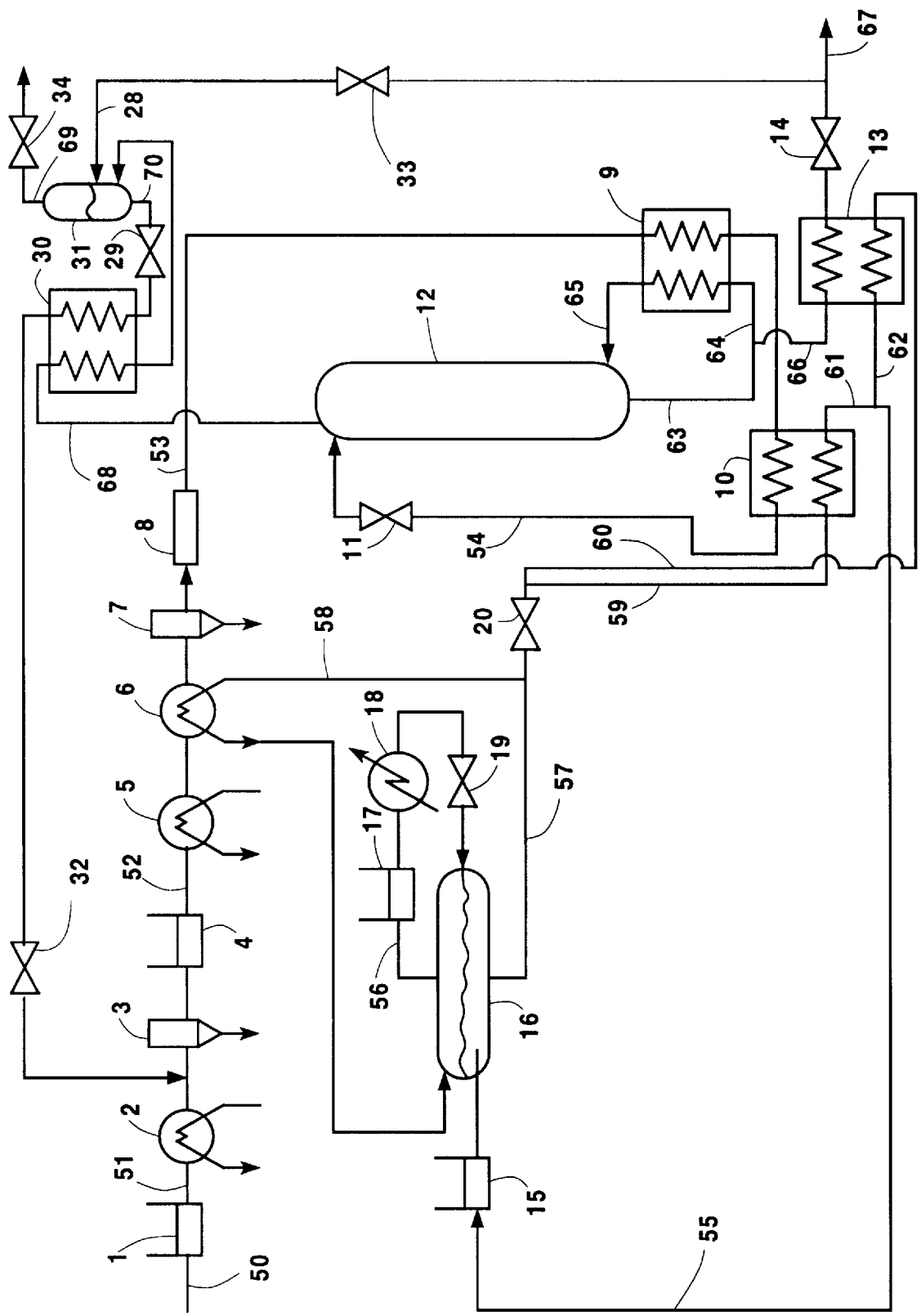

5,927,103

CARBON DIOXIDE PRODUCTION SYSTEM WITH INTEGRAL VENT GAS CONDENSER

TECHNICAL FIELD

This invention relates generally to the production of carbon dioxide.

BACKGROUND ART

Carbon dioxide has a large number of uses. For example, carbon dioxide is used to carbonate beverages, to chill, freeze and package seafood, meat, poultry, baked goods, fruits and vegetables, and to extend the shelf-life of dairy products. It is an important environmental component in industrial waste and process water treatment as a replacement for sulfuric acid to control pH levels. Other uses included drinking water treatment, an environmentally-friendly pesticide and an atmosphere additive in greenhouses to improve the growth of vegetables.

Generally carbon dioxide is produced by purifying a waste stream which is a by-product of an organic or inorganic chemical process. The waste stream comprising the carbon dioxide is condensed and then processed in a distillation column to produce the product grade carbon dioxide.

As the demand for carbon dioxide continues to increase, more marginal sources of carbon dioxide are being used to supply the crude carbon dioxide feed to the purification system. Such marginal feeds may include significant amounts of light contaminants and thus require significantly more energy to carry out the requisite liquefaction prior to the rectification into product.

Accordingly it is an object of this invention to provide a system which can effectively process a crude carbon dioxide feed stream which contains light contaminants in a more energy efficient manner than that possible with conventional carbon dioxide processing systems.

SUMMARY OF THE INVENTION

The above and other objects, which will become apparent to one skilled in the art upon a reading of this disclosure, are attained by the present invention, one aspect of which is:

A method for producing carbon dioxide comprising:

(A) providing a feed comprising carbon dioxide and light contaminants and passing said feed into a column;

(B) separating the feed within the column into light overhead and carbon dioxide product;

(C) withdrawing light overhead from the column and partially condensing light overhead by indirect heat exchange with heat exchange fluid comprising carbon dioxide and light contaminants to produce gaseous heat exchange fluid;

(D) passing the gaseous heat exchange fluid into the feed upstream of the column; and (E) recovering carbon dioxide product from the lower portion of the column.

Another aspect of the invention is:

Apparatus for producing carbon dioxide comprising:

(A) a column and feed provision means for passing a feed comprising carbon dioxide and light contaminants into the column;

(B) a vent gas condenser and means for passing fluid from the upper portion of the column to the vent gas condenser;

(C) a phase separator and means for passing fluid from the vent gas condenser to the phase separator;

(D) means for passing fluid from the phase separator to the vent gas condenser and from the vent gas condenser to the feed provision means; and (E) means for recovering carbon dioxide product from the lower portion of the column.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook fifth edition, edited by R. H. Perry and C. H. Chilton, McGraw-Hill Book Company, New York, Section 13, *The Continuous Distillation Process*.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is generally adiabatic and can include integral (stagewise) or differential (continuous) contact between the phases. Separation process arrangements that utilize the principles of rectification to separate mixtures are often interchangeably termed rectification columns, distillation columns, or fractionation columns.

As used herein, the terms "upper portion" and "lower portion" mean those sections of a column respectively above and below the mid point of the column.

As used herein, the term "indirect heat exchange" means the bringing of two fluids into heat exchange relation without any physical contact or intermixing of the fluids with each other.

As used herein, the term "light contaminants" means one or more species having a vapor pressure greater than that of carbon dioxide. Examples of light contaminants include nitrogen, oxygen, argon, hydrogen and carbon monoxide.

As used herein, the term "phase separator" means a vessel with sufficient cross-sectional area so that an entering fluid or fluids can be separated by gravity into separate gas and liquid components which can then be separately removed from the phase separator vessel.

As used herein, the term "subcooling" means cooling a liquid to be at a temperature lower than that liquid's saturation temperature for the existing pressure.

BRIEF DESCRIPTION OF THE DRAWING

The sole FIGURE is a schematic representation of one preferred embodiment of the invention.

DETAILED DESCRIPTION

The invention will be described in detail with reference to the Drawing. Referring now to the FIGURE, feed stream 50 comprising carbon dioxide, light contaminants and water vapor, typically at about ambient pressure, is passed to compressor 1 wherein it is compressed to a pressure generally within the range of from 60 to 90 pounds per square inch absolute (psia). Feed stream 50 is typically taken from the waste effluent of an organic or inorganic chemical production system such as one which produces ethanol and/or other alcohols. The concentration of carbon dioxide in the feed is generally in excess of 80 mole percent on a dry basis. The invention will have particular utility for processing a feed wherein the light contaminants comprise at least 5 mole percent on a dry basis.

Compressed feed 51 is cooled by passage through water or air driven cooler 2 and condensed moisture is separated in phase separator 3. The feed is then further compressed by passage through compressor 4 to a pressure generally within the range of from 280 to 325 psia. The further compressed feed 52 is then further cooled by passage through coolers 5 and 6. Condensed moisture is removed in phase separator 7 and the feed is further dried by passage through adsorbent bed 8.

Cooled, dried feed stream 53 is then cooled to near its dewpoint by passage through column reboiler 9 and then is provided by conduit to feed condenser 10 wherein it is at least partially condensed, preferably substantially totally condensed, by indirect heat exchange with recirculating refrigerant as will be discussed in greater detail below. Resulting condensed feed 54 is flashed through valve 11 and passed into column 12, preferably, as illustrated in the FIGURE, at the top of column 12.

Gaseous refrigerant fluid 55, which is preferably ammonia, is compressed to a moderate pressure by passage through compressor 15 and then passed into direct contact aftercooler 16. Gaseous moderate pressure refrigerant fluid is withdrawn from aftercooler 16 in stream 56 and compressed to a high pressure in compressor 17. The high pressure fluid is then substantially totally condensed by passage through heat exchanger 18 by indirect heat exchange with, for example, water or air, and then passed through valve 19 and into aftercooler 16 as the cooling medium. Moderate pressure chilled refrigerant fluid is withdrawn from aftercooler 16 in stream 57. If desired, as illustrated in the FIGURE, a portion 58 of stream 57 is passed through cooler 6 to cool the feed and then returned to aftercooler 16. The remaining portion of stream 57 is passed through valve 20 and is then divided into streams 59 and 60. Stream 59 is provided by conduit to feed condenser 10 wherein it is vaporized by indirect heat exchange with the aforesaid condensing feed, and resulting vaporized refrigerant fluid is withdrawn from feed condenser 10 as stream 61. Stream 60 is passed into subcooler 13 wherein it is vaporized by indirect heat exchange with subcooling product. Resulting vaporized stream 62 is combined with stream 61 to form gaseous stream 55 and the closed loop refrigeration cycle is repeated.

Column 12 is operating at a pressure generally within the range of from 250 to 320 psia. Within column 12 the feed is separated by distillation into light overhead and carbon dioxide product. The feed liquid flows down column 12 against upflowing vapor and light contaminants are stripped out of the downflowing liquid into the upflowing vapor to form the light overhead at the top of column 12 and the carbon dioxide product at the bottom of column 12.

Carbon dioxide product liquid, generally having a carbon dioxide concentration of at least 99.9 mole percent, is withdrawn from the lower portion of column 12 in stream 63. A portion 64 is vaporized by passage through reboiler 9 in indirect heat exchange with cooling feed, and resulting vaporized portion 65 is passed back into column 12 to serve as the upflowing vapor. Another portion 66 of stream 63 is subcooled by passage through subcooler 13, passed through valve 14 and recovered as product carbon dioxide in stream 67.

Light overhead vapor containing a higher concentration of light contaminants from that of the feed and also containing carbon dioxide is withdrawn from the upper portion of column 12 in stream 68. The light overhead is partially condensed by passage through vent gas condenser 30 and then passed into phase separator 31. If desired, a portion 28 of stream 67 may be passed through valve 33 and into phase separator 31. Vapor from phase separator 31 comprising mostly light contaminants is withdrawn from phase separator 31 in stream 69, passed through valve 34 and withdrawn from the system. Liquid containing light contaminants as well as the bulk of the carbon dioxide in the light overhead, is withdrawn from phase separator 31 as heat exchange fluid stream 70, passed through valve 29, vaporized by passage through vent gas condenser 30, passed through valve 32, and recycled to the incoming feed in the feed provision means upstream of column 12.

The use of heat exchange fluid containing both light contaminants and carbon dioxide to drive the vent gas condenser enables the partial condensation of the light overhead stream in the vent gas condenser to proceed with a lower energy usage. The multicomponent heat exchange fluid minimizes process lost work by reducing the temperature difference between the cooling, partially condensing light overhead stream relative to the vaporizing multicomponent heat exchange fluid throughout the vent gas condenser. In addition, since the multicomponent heat exchange fluid contains carbon dioxide and lighter contaminants as does the feed, the gaseous multicomponent heat exchange fluid from the vent gas condenser is combined with the feed for additional carbon dioxide production enabling a further process efficiency for the invention.

Now with the use of this invention one can provide efficiently and effectively product grade carbon dioxide by distillation from a feed containing significant levels of light contaminants. Although the invention has been described in detail with reference to a certain preferred embodiment, those skilled in the art will recognize that there are other embodiments of the invention within the spirit and the scope of the claims. For example, if the process utilizes particular compressors, such as oil flooded screw compressors, that can accommodate a sidestream, heat exchange fluid stream 70 can be vaporized and rewarmed at an intermediate pressure level and introduced into compressor 4 at an appropriate sideport inlet. Alternatively, heat exchange fluid stream 70 can be compressed independently in a separate compressor parallel to compressor 4 and then added to feed stream 52. Also, the compressed heat exchange fluid stream 70 can be independently condensed in a condenser that is parallel to unit 10 and then added to the feed stream prior to its introduction into the column.

I claim:

1. A method for producing carbon dioxide comprising:
   (A) providing a feed comprising carbon dioxide and light contaminants and passing said feed into a column;
   (B) separating the feed within the column into light overhead and carbon dioxide product;
   (C) withdrawing light overhead from the column and partially condensing light overhead by indirect heat exchange with heat exchange fluid comprising carbon dioxide and light contaminants to produce gaseous heat exchange fluid;

(D) passing the gaseous heat exchange fluid into the feed upstream of the column; and (E) recovering carbon dioxide product from the lower portion of the column.

2. The method of claim 1 wherein the feed is condensed prior to being passed into the column.

3. The method of claim 2 wherein the feed is condensed by indirect heat exchange with recirculating refrigerant.

4. The method of claim 1 wherein the heat exchange fluid comprises carbon dioxide product taken from the lower portion of the column.

5. The method of claim 1 wherein the heat exchange fluid comprises light contaminants from the partially condensed light overhead.

6. Apparatus for producing carbon dioxide comprising:

(A) a column and feed provision means for passing a feed comprising carbon dioxide and light contaminants into the column;

(B) a vent gas condenser and means for passing fluid from the upper portion of the column to the vent gas condenser;

(C) a phase separator and means for passing fluid from the vent gas condenser to the phase separator;

(D) means for passing fluid from the phase separator to the vent gas condenser and from the vent gas condenser to the feed provision means; and (E) means for recovering carbon dioxide product from the lower portion of the column.

7. The apparatus of claim 6 wherein the feed provision means includes a feed condenser and the means for passing fluid from the vent gas condenser to the feed provision means communicates with the feed provision means upstream of the feed condenser.

8. The apparatus of claim 6 further comprising means for passing fluid from the lower portion of the column to the phase separator.

9. The apparatus of claim 6 wherein the means for recovering carbon dioxide product from the lower portion of the column includes a subcooler.

10. The apparatus of claim 6 wherein the feed provision means includes a reboiler further comprising means for passing fluid from the lower portion of the column to the reboiler and from the reboiler to the lower portion of the column.

\* \* \* \* \*